Figure 1:
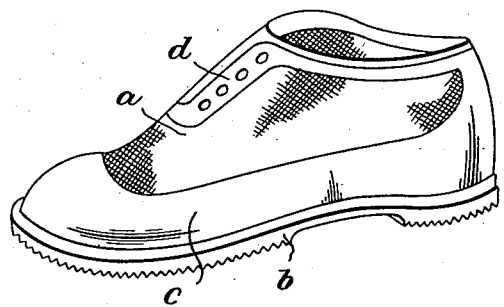

July 21, 1936. I. DOROGI ET AL 2,048,185

SHOE CONSISTING OF TEXTILE MATERIAL AND OF RUBBER

Filed May 15, 1933

Inventors.
ISTVAN DOROGI
LAJOS DOROGI

By Mock & Blum
Attorneys.

Patented July 21, 1936

2,048,185

UNITED STATES PATENT OFFICE 2,048,185

SHOE CONSISTING OF TEXTILE MATERIAL AND OF RUBBER

István Dorogi and Lajos Dorogi, Budapest, Hungary, assignors of one-half to Magyar Ruggaantaárugyár Reszvenytarsaság, Budapest, Hungary Application May 15, 1933, Serial No. 671,056 In Hungary February 1, 1933

1 Claim. (Cl. 36—45)

The rubber covering of the upper part of shoes composed of rubber and fabric and made without the use of moulds hitherto consisted of rubber parts obtained either by spreading rubber solutions on the fabric or by affixing rubber sheets by means of adhesive. The affixing of rubber members by means of adhesive for waterproofing, ornamenting, strengthening and other purposes meets with great difficulties. The layer of adhesive extends more or less beyond the rubber sheet and detracts from the pleasant exterior appearance of the shoe. Besides, the affixing of rubber sheets by means of adhesive when manufacturing on a large scale requires very great care and relatively expensive equipment and also a multiplicity of steps.

This invention relates to a shoe having an appearance similar to that of shoes made in moulds, with a fabric upper partly or entirely covered with a rubber layer. Said shoe may be produced without moulds; the production of such shoe is cheaper than that of a shoe made in moulds and yet it is very pleasant looking and durable.

According to the invention, a composite shoe of vulcanized rubber and of textile material is made without moulds. The rubber member or members applied to the fabric upper for waterproofing, ornamenting or strengthening said upper, or a part of said upper, are affixed by pressing said rubber member or members on the fabric over the whole surface of said upper or at least along the edges of said rubber members after previously stamping out said rubber member or members or simultaneously with such stamping. The use of stamps or dies is substantially cheaper than working with moulds. It secures great elasticity and variety to the production. By means of simple wire stamps rubber coverings of any desired shape, defined relative to the fabric by definite lines, may be applied to textile material and therefore models of shoes may at any time be produced quickly, and with minimum expense.

The production of the shoe according to the invention may be effected in several ways. Generally the required rubber parts (unvulcanized) are first affixed to the fabric in such manner that at least the edge portions of the rubber parts or a part thereof are pressed on to the fabric by stamping and said rubber parts are simultaneously provided with definite shapes. Thereafter the shoe upper is assembled on the last and after application of the rubber sole and heel the two upper parts and the sole and heel are vulcanized together. A fabric upper part may be formed on a last and subsequently, by means of suitable tools, the required rubber parts may be pressed on, so that at least the borders of the rubber parts, or parts of said borders, are pressed on by die-pressure. Thereupon, after removing the pressing tools or prior to applying them, the heel and sole are affixed to the upper and all the parts are simultaneously vulcanized.

The invention is particularly suitable for the purpose of producing a shoe such as a sports shoe, the upper part of which is provided with a partial side rubber covering which is affixed by pressure.

Figure 2:
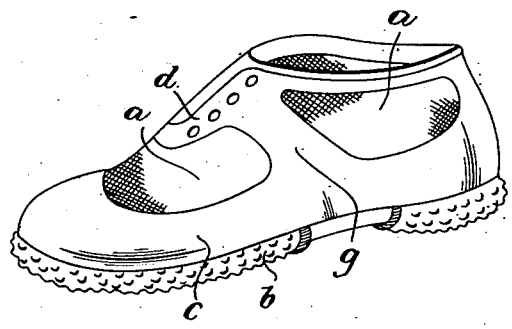

On the enclosed drawing, Figs. 1 and 2 are perspective views of completed shoes made according to the invention.

The upper part of the shoe shown in Fig. 1 is provided with a rubber $c$ covering the lower part and the toe of the upper, and extending around the rear of the upper. The fabric parts $a$ are left uncovered and said fabric parts are defined by sharp edge lines. The rubber covering also includes front edge portions $d$, which are pierced to permit the use of laces. This shoe has a rubber member $b$, which forms the heel and sole of the shoe.

As shown in Fig. 2 the rubber member covers the lower part and the toe of the upper of the shoe, and the heel part of the upper. This construction is generally similar to Fig. 1, save that the fabric has two exposed areas $a$, which are separated by tongues $g$ of the rubber covering.

In affixing a rubber member to the upper, the die presses the rubber so that it penetrates the interstices of the canvas, thus firmly connecting the rubber to the canvas. A rubber sheet may be applied to the canvas, and the die may be provided with blunt edges, so that it cuts the rubber member into shape, without cutting the fabric. The die applies pressure to the entire rubber member, or to a part thereof. The rubber member substantially stiffens the adjacent part of the canvas. The self-adhesion of the rubber to the fabric, over all or over a part of the rubber, prevents the spoiling of the appearance of the upper by exposed adhesive.

Having now particularly described and ascertained the nature of our said invention and in what manner the same is to be performed, we declare that what we claim is:

A shoe having a fabric upper which has separated front edges, a part of said upper having thereon a rubber covering member, a first portion of said covering member extending up to the lower edge of said upper, a second portion of said covering member being lapped around the top edge of said upper, a third portion of said covering member being lapped around the separated front edges of said upper, said covering member having a part thereof extending between said first portion and said third portion and below the second portion of said rubber member to cover the corresponding part of said upper, said covering member being vulcanized and having a part thereof extending into the interstices of said fabric upper, the first portion and the second portion having parts thereof spaced from each other.

ISTVÁN DOROGI.
LAJOS DOROGI.